"""

US009296958B2

(12) United States Patent
Wen et al.

(10) Patent No.: US 9,296,958 B2
(45) Date of Patent: Mar. 29, 2016

(54) PROCESS AND APPARATUS FOR TREATING HYDROCARBON STREAMS

(75) Inventors: Shixue Wen, Friendswood, TX (US); Mark W. Mucek, Spring Grove, IL (US); Steven A. Bradley, Arlington Heights, IL (US); Benjamin L. Tiemens, Evanston, IL (US); Donald A. Eizenga, Elk Grove Village, IL (US)

(73) Assignee: UOP LLC, Des Plaines, IL (US)

( * ) Notice: Subject to any disclaimer, the term of this patent is extended or adjusted under 35 U.S.C. 154(b) by 185 days.

(21) Appl. No.: 14/348,162

(22) PCT Filed: Sep. 30, 2011

(86) PCT No.: PCT/US2011/054173
§ 371 (c)(1),
(2), (4) Date: Mar. 28, 2014

(87) PCT Pub. No.: WO2013/048433
PCT Pub. Date: Apr. 4, 2013

(65) Prior Publication Data
US 2014/0251868 A1    Sep. 11, 2014

(51) Int. Cl.
*C10G 45/00* (2006.01)
*C10G 49/00* (2006.01)
*C10G 75/00* (2006.01)
*B01J 19/02* (2006.01)
*B23K 35/30* (2006.01)
*C22C 38/00* (2006.01)
*C22C 38/02* (2006.01)
*C22C 38/04* (2006.01)
*C22C 38/42* (2006.01)
*C22C 38/44* (2006.01)
*C22C 38/48* (2006.01)

(52) U.S. Cl.
CPC .............. *C10G 49/005* (2013.01); *B01J 19/02* (2013.01); *B23K 35/308* (2013.01); *B23K 35/3066* (2013.01); *B23K 35/3086* (2013.01); *C10G 75/00* (2013.01); *C22C 38/001* (2013.01); *C22C 38/02* (2013.01); *C22C 38/04* (2013.01); *C22C 38/42* (2013.01); *C22C 38/44* (2013.01); *C22C 38/48* (2013.01); *B01J 2219/0286* (2013.01)

(58) Field of Classification Search
CPC ..................................................... C10G 45/00
USPC ............... 208/208 R, 189, 262.1; 585/920
See application file for complete search history.

(56) References Cited

U.S. PATENT DOCUMENTS

| 4,035,182 A | 7/1977 | Kowaka et al. |
|---|---|---|
| 4,077,801 A | 3/1978 | Heyer |
| 4,108,641 A | 8/1978 | Fujioka et al. |
| 4,816,217 A | 3/1989 | Bassford |
| 4,834,807 A | 5/1989 | Burley |
| 5,010,316 A | 4/1991 | Burley |
| 5,030,294 A | 7/1991 | Burley |
| 5,406,014 A | 4/1995 | Heyse et al. |
| 5,413,700 A | 5/1995 | Heyse et al. |
| 5,693,155 A | 12/1997 | Mousseaux et al. |
| 5,807,842 A | 9/1998 | Buscemi |
| 5,863,418 A | 1/1999 | Heyse et al. |
| 6,063,264 A | 5/2000 | Haritatos |
| 6,458,318 B1 | 10/2002 | Nishiyama et al. |
| 6,548,030 B2 | 4/2003 | Heyse et al. |
| 6,702,906 B2 | 3/2004 | Ogawa |
| 7,220,494 B2 | 5/2007 | Lundberg |
| 7,790,942 B2 | 9/2010 | Hechler |
| 7,847,118 B2 | 12/2010 | Hechler et al. |
| 8,133,431 B2 | 3/2012 | Osuki |
| 2009/0274927 A1 | 11/2009 | Narita |
| 2010/0054983 A1* | 3/2010 | Osuki ................... C22C 38/001 420/38 |
| 2014/0148628 A1 | 5/2014 | Bradley |

FOREIGN PATENT DOCUMENTS

| CN | 101307409 A | 11/2008 |
|---|---|---|
| EP | 258907 B1 | 4/1991 |
| EP | 2100977 A1 | 9/2009 |
| JP | S58184094 A | 10/1983 |
| JP | S59127991 A | 7/1984 |
| JP | 59229468 A | 12/1984 |
| JP | 61040396 A | 2/1986 |

OTHER PUBLICATIONS

Supplementary European Search Report for Application No. EP11872896, dated Jul. 7, 2015.
PCT International Preliminary Report on Patentability for PCT/US2011/054173, mailed Apr. 10, 2014.
Lima, "Sensitization evaluation of the austenitic stainless steel AISI 304L, 316L, 321 and 347"; Journal of Materials Science, Jan. 2005, v.40, n. 1 (2005), pp. 139-144.
Singh, "Niobium stabilized alloys in steam hydrocarbon reforming", Materials Performance, v.48, n. 12, p. 54-58, Dec. 2009.
Silva, "Microstructural and electrochemical characterization of the low temperature sensitization of AISI 321 stainless steel tube used in petroleum refining plants", Journal of Materials Science, v. 38, n. 5, p. 1007-1011, Mar. 1, 2003.
Messer, "Optimized heat treatment of 347 type stainless steel alloys for elevated temperature service to minimize cracking", Conference: Corrosion 2004, Mar. 28, 2004-Apr. 1, 2004.
Chen, "Stress corrosion cracking of type 321 stainless steels under simulated petrochemical conditions containing thiosulfate and chloride", Corrosion, v. 62, n. 9, p. 781-794, Sep. 2006.

(Continued)

Primary Examiner — Thuan D Dang

(57) ABSTRACT

A process and apparatus are disclosed for treating a hydrocarbon stream, the process including flowing the hydrocarbon stream through a hydrocarbon treating vessel, heating a portion of the hydrocarbon treating vessel to a predetermined temperature and for a predetermined amount of time and controlling sensitization and chloride stress corrosion cracking of the portion of the interior surface of the hydrocarbon treating vessel.

6 Claims, 1 Drawing Sheet

(56) References Cited

OTHER PUBLICATIONS

Yoon, "Correlation of chemistry, microstructure and ductile fracture behaviours of niobium-stabilized austenitic stainless steel at elevated temperature", Scripta Materialia, vol. 57, Issue 1, Jul. 2007, p. 25-28.
Yoo, "The effect of the carbon and nitrogen contents on the fracture toughness of Type 347 austenitic stainless steels", Materials Science and Engineering: A, vol. 405, Issues 1-2, Sep. 25, 2005, p. 147-157.
Ledjeff, "Oxidation and carburization of high-alloy materials for cracking tubes—1. Oxidation Behavior in Air", Werkst. Korros., v.30, n. 11, p. 767-784, Nov. 1979.
Yakuwa, "Sulfidation-Resistant Nickel-Based Superalloy for Fluid Catalytic Cracking Gas Expander Turbine", Corrosion, v. 57, n. 11, p. 986-998, Nov. 2001.
Giraud, "Cracking of Heavy Petroleum Oils—3. The Effect of the Furnace Wall Material" Inf. Chim., n. 184, p. 111-115, Dec. 1978.
Sebastijanovic, "The analysis of causes for a change in material properties in the pressure vessel during exploitation", American Society of Mechanical Engineers, Pressure Vessels and Piping Division (Publication) PVP, 2000, v. 401, p. 145-150.
McClain, "Crude and vacuum distillation and delayed coking: Delaying Coking", NPRA Question and Answer Session on Refining and Petrochemical Technology, 2002; Conference: 2002 NPRA Technology Q and A transcripts: Refining Excellence, Oct. 15, 2002-Oct. 18, 2002.
Oberndorfer, "Application limits of stainless steels in the petroleum industry", Materials and Corrosion—Werkstoffe and Korrosion, v. 55, n. 3, p. 174-180, Mar. 2004.
Chen, "Stress corrosion cracking of type 321 stainless steels in simulated petrochemical process environments containing hydrogen sulfide and chloride", Materials Science and Engineering A, v. 407, n. 1-2, p. 114-126, Oct. 25, 2005.
Haruyama, "Stress Corrosion cracking by cooling water of stainless steel shell-and-tube heat exchangers" Material Performance v. 21, n. 3, p. 14-19, Mar. 1982.
Yuen, "Acoustic emission testing of a process reactor", American Society of Mechanical Engineers, Pressure Vessels and Piping Division (publication) PVP, 2005, v. 7, p. 343-356, Proceedings of the ASME Pressure Vessels and Piping Conference 2005—Operations, Applications and Components, PVP2005.
Liu, "Corrosion of TP347H FG stainless steel in a biomass fired PF utility boiler", Journal of Materials Science, 2001, v. 36, n. 4, p. 1015-1026.
Rao, "Repairing cracks in refinery heat exchangers", Welding Journal (Miami, Florida), Sep. 2009, v. 88, n. 9, p. 38-41.
Sawaragi, "Properties after service exposure of a new 18-8 austenitic steel tube (0.1C—18Cr-—9Ni—3Cu—Nb,N) with high elevated temperature strength for fossil fired boilers" First International Conference on Microstructures and Mechanical Properties of Aging Materials, 1993, p. 179-186.
Sawaragi, "Development of a new 18-8 austenitic steel tube (ST3Cu) with high elevated temperature strength for fossil fired boilers", Sumitomo Metals, Oct. 1991, v. 43, n. 6, p. 24-31.
Ishitsuka, "Development of 18Cr—9Ni—W—Nb—V—N austenitic stainless steel tube for thermal power boilers", JSME International Journal, Series A: Solid Mechanics and Material Engineering, Jan. 2002, v. 45, n. 1, p. 110-117.
Matsuda, "Saving maintenance costs on a hydro-cracker in a refinery complex using Sumitomo 347AP steel tube", Stainless Steel World, Oct. 2010, www.stainless-steel-world.net.
Select Arc Inc. (03/13), Select-Arc Premium Welding Products (catalog), p. 1-100, www.select.arc.com.
ASTM, A240/A240M . . . , p. 42, 45, 118, 184.
ASTM, "Standard Practices for Detecting Susceptibility to Intergranular Attack in Austenitic Stainless Steels1" ASTM International 2008—Designation: A 262-02a (Reapproved 2008).

\* cited by examiner

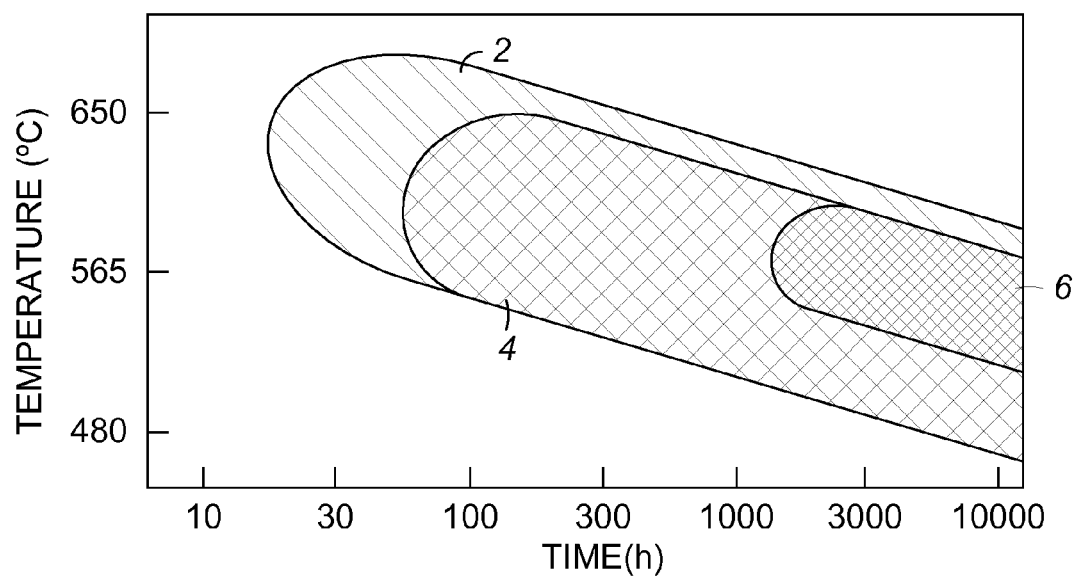

PROCESS AND APPARATUS FOR TREATING HYDROCARBON STREAMS

CROSS-REFERENCE TO RELATED APPLICATIONS

This application is a national stage entry under 35 U.S.C. 371 of International Application No. PCT/US2011/54173 filed Sep. 30, 2011.

FIELD OF THE INVENTION

The field of the invention is treating hydrocarbon streams and more particular to a process and apparatus for treating hydrocarbon streams.

BACKGROUND OF THE INVENTION

Oil refineries typically incorporate one or more different processes for treating and/or converting hydrocarbons, such as, for example, those present in crude oil or other naturally occurring source, to produce specific hydrocarbon products with properties that are useful for particular applications.

To carry out the hydroprocessing operations to treat crude oil and other hydrocarbons to form usable products, oil refineries typically include one or more complexes or groups of equipment designed for carrying out one or more particular treating or conversion processes to prepare desired final products. In this regard, the complexes each may have a variety of interconnected units or vessels including, among others, tanks, furnaces, distillation towers, reactors, heat exchangers, pumps, pipes, fittings, and valves.

Many types of hydrocarbon treating operations are carried out under relatively harsh operating conditions, including high temperatures and/or pressures and within various harsh chemical environments. In addition, due to the large demands for hydrocarbon and petrochemical products, the volumetric flow rate of a hydrocarbon stream through various oil refinery complexes is substantial, and the amount of downtime of the processing equipment is preferably small to avoid losses in output.

High temperature hydrocarbon treating operations generally involve heating a hydrocarbon stream to a process temperature and flowing the hydrocarbon stream through one or more hydrocarbon treating vessels forming a refinery complex. Specific process techniques are utilized depending on the feed and the desired products, and may include flowing the hydrocarbon stream in the presence of other materials and/or reactants, including gases and liquids, adsorbents to remove particular components from the product stream, and/ or catalysts to control reaction rates. In this manner, the hydrocarbon stream can be treated to, for example, modify one or more components within the hydrocarbon stream, react one or more components with other materials (e.g. gases) within a vessel, and remove components from the hydrocarbon stream either as potential products, sometimes upon further processing, or for disposal.

Traditionally, austenitic stainless steels have been used to fabricate the oil refinery vessels listed above, because these types of alloys are useful in a variety of harsh environments. The addition of 8% nickel to a stainless steel containing 18% chromium produces a remarkable change in microstructure and properties. The alloy solidifies and cools to form a face-centered cubic structure called austenite, which is non-magnetic. Austenitic stainless steels are highly ductile, even at cryogenic temperatures and have excellent weldability and other fabrication properties.

Many metals, including austenitic stainless steels, can be subject to a highly localized form of corrosion known as stress-corrosion cracking (SCC). SCC often takes the form of branching cracks in apparently ductile material and can occur with little or no advance warning. In low pressure vessels, the first sign of stress corrosion cracking is usually a leak, but there have been instances of catastrophic failures of high pressure vessels due to stress corrosion cracking. Stress corrosion cracking occurs when the surface of the material exposed to a corroding medium is under tensile stress and the corroding medium specifically causes stress corrosion cracking of the metal. Tensile stresses may be the result of applied loads, internal pressure in piping systems and pressure vessels or residual stresses from prior welding or bending.

Austenitic stainless steels can be subject to stress corrosion cracking in, for example, hot chloride solutions, hot caustic soda and hot sulfides or polythionates. Specifically, stress corrosion cracking has been found to occur within refinery complex vessels due to the presence of even small quantities of sulfur content that is either added during a refinery process or is present in the feedstock. The risk of polythionic acid stress corrosion cracking generally increases in temperature ranges of between 370 and 815° C.

In order for polythionic acid stress corrosion cracking to occur in austenitic stainless steels, typically the steel must first undergo sensitization and either concurrently or subsequently be subjected to a corrosive agent, such as polythionic acid. For example, unstabilized grades of austenitic stainless steels such as types 304 and 316, traditionally used in the fabrication of oil refinery complexes, have all exhibited sensitization and polythionic acid stress corrosion cracking due to polythionic acid. Even the stabilized grades such as type 321 and 347 can exhibit sensitization and polythionic acid SCC. Typically, chromium within the austenitic stainless steels reacts with oxygen to form a passive film of chromium oxide that protects the material from corrosion. The passivated metal is able to resist further oxidation or rusting. At high temperatures, however, usually somewhere in the range of between 370 and 815° C. depending on the stainless steel alloy, chromium-rich carbides precipitate out at the grain boundaries. The precipitation of chromium depletes the chromium content adjacent to the grain boundaries forming chromium depleted zones and drastically reducing the corrosion and/or cracking resistance in corrosive environments in these zones. PTA-SCC requires the combination of sulfide scale formation on the metal surface, sensitized microstructure, tensile stress, moisture and oxygen.

FIG. 1, reproduced from D. V. Beggs and R. W. Howe, "Effects of welding and Thermal Stabilization on the Sensitization and Polythionic Acid Stress corrosion Cracking of Heat and Corrosion-Resistant Alloys", NACE Conference 1993, Paper no. 541, illustrates the temperatures and times at which traditional austenitic stainless steels have been found to exhibit sensitization. As can be seen from the FIGURE, the peak temperatures and times for sensitization of austenitic stainless steels are material specific, although they all generally occur within a temperature range of between 565° and 650° C. Specifically, type 347 stainless steel exhibits peak sensitization at 565° C., (i.e. exhibits sensitization at this temperature faster than at higher or lower temperatures) but does not sensitize at this temperature until after 1,000 hours of being held at the elevated temperature. Type 347 stainless steel is often used in refinery processing equipment due to the longer time that it can withstand sensitization when compared with other stainless steels as shown in FIG. 1. As illustrated in FIG. 1, each stainless steel alloy exhibits a different sensitization envelope, i.e., area on a time/temperature diagram where the alloy exhibits sensitization.

One particularly harsh environment in which austenitic stainless steels are typically observed to undergo stress corrosion cracking is an environment containing halides, usually in the form of chlorides. The presence of chlorides along with an aqueous phase and tensile stresses can result in chloride stress corrosion cracking ("chloride-SCC") of austenitic stainless steels. This type of cracking is predominantly transgranular and is dependent on time, oxygen, and chloride concentration. Stress corrosion cracking due to chlorides is usually observed in areas of austenitic stainless steels subjected to tensile stresses in the presence of chlorides, oxygen. In general, chloride-SCC will occur where high concentrations of chlorides are present, but may occur in lower concentrations at elevated temperatures. In addition, while high temperatures may reduce the amount of time required for a particular chloride concentration to result in chloride SCC, often lower temperatures cause chlorides to condense on surfaces increasing the concentration of the chlorides on the surfaces. Thus, chloride SCC can be problematic at many temperature ranges. For example, chloride-SCC can occur where chloride concentrations are able to build up, for example by pitting or crevice corrosion of the material surface or on heated surfaces or where chlorides present in the environment condense on a material surface. Chlorides are able to penetrate the passive film to allow corrosive attack of the material to occur. One particularly problematic area of chloride SCC is in condensers where chloride condenses and concentrates on surfaces of the vessel.

Another type of harsh corrosive environment to which sensitized stainless steels are particularly susceptible is one that contains polythionic acid (PTA) formed from the decomposition of sulfide scale by moisture in air. Due to the high temperature of operation and the presence of sulfur (S) and hydrogen sulfide ($H_2S$) in a reducing environment or in a feed stream in many oil refinery complexes and/or processes, an iron sulfide scale can form on stainless steel surfaces. Upon shutdown of the equipment, if the sensitized stainless steel is exposed to moisture and oxygen from the surrounding environment, there is the potential that the metal can crack as a result of polythionic acid stress corrosion cracking (PTA-SCC). In other words, the sulfur and hydrogen sulfide will react with oxygen and moisture from the ambient environment to form polythionic acid. Due to the existence of the chromium depleted zones formed by sensitization, the PTA can attack these zones causing corrosion and ultimately PTA-SCC where the vessel is put under tensile stresses either by being pressurized or by having residual stresses from, for example, welding during fabrication.

Commercially, internal surfaces of refinery complex equipment for carrying out processes at elevated temperatures are usually made of Type 304 and Type 347 austenitic stainless steels, especially for use in sulfur or $H_2S$-containing reducing environments, such as for example hydroprocessing and hydrocracking reactors, heaters and heat exchangers, complexes for converting of liquid petroleum gas (LPG) into aromatics through dehydrocyclodimerization, and processes for catalytic dehydrogenation for the production of light olefins from paraffins. The most widely used stainless steel is probably Type 304, sometimes called T304 or simply 304, because of cost. Type 304 stainless steel is an austenitic steel containing 18 to 20% chromium and 8 to 10% nickel. This and other specialty austenitic stainless steels have been used in these applications due to the high temperature $H_2S$, sulfur, and chloride-SCC corrosion and high temperature hydrogen attack issues that are present in these processes.

In some instances, protective coatings are applied to protect the outside of stainless steel vessels from exposure to chlorides in insulating jackets. In other applications, post welding heat treatment can be used to relieve residual stress in the steel alloys. The risk of PTA-SCC and chloride-SCC in oil refinery equipment has heretofore primarily been addressed by known processes to either prevent the formation of PTA and/or presence of chlorides or to neutralize the PTA in the environment prior to exposure to air.

To reduce the affects of chloride-SCC, precautions are typically taken to minimize the amount of chloride in the process material or feed that will come into contact with austenitic stainless steel equipment. For example, a particular process may utilize a high chloride feed. In addition, precautions are taken to limit the chloride content to low levels in any flushing, purging, or neutralizing agents used in the system.

Preventing PTA formation can be accomplished by either eliminating liquid phase water or oxygen, since these are the components responsible for reacting with the sulfide scale to form the PTA. One approach is to maintain the temperature of the austenitic stainless steel equipment above the dew point of water to avoid condensation of the moisture. Another approach is to purge the equipment with a dry nitrogen purge during any shutdown or startup procedure, when the system is depressurized and the equipment is opened and exposed to air, since this is generally the only time when significant amounts of oxygen might enter the system.

On the other hand, PTA that has or is likely to form within a complex or vessel may be neutralized by an ammoniated nitrogen purge or an aqueous solution of soda ash. In the case of utilizing an ammoniated nitrogen purge, special procedures are utilized to form the ammoniated nitrogen, which is pressurized and blown into the system. On the other hand, a soda ash solution neutralization step involves completely filling the piping or piece of equipment involved with the solution and allowing the equipment to soak for a minimum of two hours prior to exposing the system to air. Each of these processes is time consuming and impractical during the operation of an oil refinery complex as it requires additional materials and additional downtime of the particular equipment to perform the purge or neutralization steps. In addition, due to the presence of the nitrogen, ammoniated nitrogen, or soda ash, special precautions must be taken to protect service workers working on the equipment when these materials are present. Also the removal of these chemicals reduces the need for special handling and waste disposal. If trace levels of the chemicals remain, which is often the case, catalyst in the reactor can be poisoned.

In addition, chemically stabilized austenitic stainless steels like TP321 and TP347 have been used in reactors that process sulfur and chloride containing streams because of their resistance to high-temperature corrosion. However, such austenitic stainless steels are also susceptible to PTA-SCC as a result of exposure to polythionic acid, since it is just a matter of time at temperature for them to sensitize, which falls within the operating conditions of many hydrocarbon treatment processes. Similarly, these materials are susceptible to chloride-SCC through exposure to chlorides at sufficient times and temperatures. Although TP321 and TP347 are generally used in applications according to the above methodologies in petroleum refinery industries, the need for post-weld heat treatment and for special procedures during shutdown and startup of a refinery complex affect not only costs but also production time since they take a certain amount of time to carry out.

There is a continuing need, therefore, for improved processes for treating hydrocarbon streams while avoiding expensive, time consuming and inconvenient additional steps for purging or neutralizing the internal environment to avoid forming polythionic acid and reducing the presence of chlorides within hydrocarbon treating vessels and causing PTA-SCC and chloride-SCC.

BRIEF SUMMARY OF THE INVENTION

According to one approach, a process is provided for treating a hydrocarbon stream. The process includes flowing the hydrocarbon stream through a hydrocarbon treating vessel. In addition, the process includes heating at least a portion of an interior surface of the vessel to a predetermined vessel temperature of 565° C. or greater for 1,000 hours or more. In this regard, the vessel is heated at a temperature and for a time where sensitization of the portion of the interior surface would normally occur. The process further includes controlling the sensitization and chloride stress corrosion cracking that occurs in the portion of the hydrocarbon treating vessel by employing a hydrocarbon treating vessel with at least the portion thereof formed of a novel austenitic stainless steel alloy having 0.005 to 0.020 wt-% carbon, 10 to 30 wt-% nickel, 15-24 wt-% chromium, 0.20 to 0.50 wt-% niobium, up to 5% copper, and 0.06 to 0.10 wt-% nitrogen to restrict sensitization of the portion of the interior surface. Surprisingly, it has been found that sensitization of the portion of the interior surface of the hydrocarbon treating vessel is reduced or restricted, even though the portion is heated to a temperature and for a time that would typically result in sensitization for hydrocarbon treating vessels formed of traditional austenitic stainless steel.

According to another approach, an apparatus is provided for treating a hydrocarbon stream. The apparatus includes a hydrocarbon treating vessel for receiving the flow of a hydrocarbon stream therethrough. The apparatus also includes an inner surface portion of the hydrocarbon treating vessel formed of a novel austenitic stainless steel alloy comprising 0.005 to 0.020 wt-% carbon, 10 to 30 wt-% nickel, 15-24 wt-% chromium, 0.20 to 0.50 wt-% niobium, 0.06 to 0.10 wt-% nitrogen, less than 5% copper, and 1.0 to 7 wt-% molybdenum to restrict sensitization and chloride stress corrosion cracking of the portion of the interior surface of the hydrocarbon treating vessel. In this manner, the portion of the inner surface of the hydrocarbon treating vessel restricts sensitization and chloride stress corrosion cracking, even if it is raised to a temperature above a predetermined temperature where sensitization typically occurs. In addition, the inner surface portion restricts chloride stress corrosion cracking even though chloride is present within the hydrocarbon treating vessel and contacts the interior surface portion at concentrations above a predetermined concentration at which chloride stress corrosion cracking is usually expected.

BRIEF DESCRIPTION OF THE DRAWINGS

FIG. 1 is a graph showing sensitization envelopes of traditional austenitic stainless steel alloys.

DEFINITIONS

The term "vessel" means any type of container, tank, reactor, pipe, tower, column, exchanger or other structure or apparatus within an oil refinery complex that holds a hydrocarbon fluid or allows a hydrocarbon stream to flow therethrough on a continuous or a batch or intermittent basis during operation of the oil refinery complex.

The term "hydrocarbon treating vessel" means a vessel within an oil refinery complex The term "maintaining" means that the material flow is maintained for an indicated period of time, but may be interrupted for maintenance or service. As used herein, a hydrocarbon flow is maintained even though it may be interrupted for routine or unexpected maintenance, service, or repair.

The term "interior surface" means any exposed surface within a hydrocarbon treating vessel, including both the vessel interior walls as well as any other structures within the vessels such as screens, tubes, internal equipment etc.

DETAILED DESCRIPTION

A process for treating a hydrocarbon feed stream including one or more different hydrocarbons and which may include other components and/or impurities is provided that includes flowing the hydrocarbon stream through a hydrocarbon treating vessel. The hydrocarbon treating vessel may be included as part of a larger oil refinery complex capable of performing one or more particular types of hydrocarbon conversion or treatment processes for converting or treating one or more components of the hydrocarbon feed stream to form a desired product. The process includes flowing the hydrocarbon stream into the hydrocarbon treating vessel for treatment thereof. Heat is applied to the hydrocarbon stream and/or the vessel during operation. Heat may be applied to the hydrocarbon stream while it is within or before entering the hydrocarbon treating vessel to raise the temperature thereof to a process temperature. In this manner, the hydrocarbon treating vessel is also heated to a predetermined vessel temperature either by heating the hydrocarbon stream therein or by heat transfer from the hydrocarbon stream to the vessel walls. Particular process parameters or operating conditions, such as temperature, pressure, and space velocity, are typically process specific and are selected to promote the particular reactions or treatment steps of the particular process.

In one approach the process is maintained for a predetermined amount of time. In this regard, it should be noted that the process may be shut down intermittently for servicing or replacement of equipment, inspection, or for other reasons. In other words, other than periodic and/or intermittent shutdowns, according to this approach, the process is maintained for the predetermined amount of time, including flowing the hydrocarbon stream through the hydrocarbon treating vessel and heating the hydrocarbon stream and the vessel so that the vessel is maintained at the predetermined temperature.

In one approach, the process includes controlling halide stress corrosion cracking, and more particularly, chloride-SCC of a portion of the interior surface of the vessel that is heated to a predetermined vessel temperature. The process may include controlling chloride-SCC of the interior surface portion even though chloride is present within the vessel during operation thereof. In one form, controlling chloride-SCC of the interior surface portion is achieved by employing the portion of the interior surface formed from a novel molybdenum containing, novel austenitic stainless steel.

In one approach, the process includes controlling sensitization of a portion of the interior surface of the vessel that is heated to a predetermined vessel temperature. Controlling sensitization includes restricting or reducing the amount of sensitization that occurs and may involve restricting or reducing the extent of precipitation of chromium carbides within the material of the portion of the interior surface of the hydrocarbon treating vessel. The precipitation of chromium carbides is controlled even though the hydrocarbon treating vessel is heated to a predetermined vessel temperature for a predetermined amount of time, to a point where sensitization is typically observed within a sensitization envelope of a traditional austenitic stainless steel. Controlling precipitation of chromium carbides within the interior surface of the hydrocarbon treating vessel may be achieved by heating at least a portion of the interior surface of the hydrocarbon treating vessel formed from the novel austenitic stainless steel.

In one approach, the interior surface of the hydrocarbon treating vessel may be heated above a predetermined vessel temperature by the flow of the hydrocarbon stream therethough, where the hydrocarbon stream is heated to the predetermined temperature before entering the vessel, and heat is transferred from the hydrocarbon stream to the interior surface. In another approach, the interior surface of the hydrocarbon treating vessel may be heated above the predetermined vessel temperature by applying heat to the vessel or internal equipment or structure by use of fired heaters, heat exchangers, or other heating equipment in order to raise the temperature of the hydrocarbon stream flowing therethrough to process temperatures.

The hydrocarbon treating vessel may be heated to a predetermined vessel temperature and maintained at the predetermined vessel temperature for the predetermined amount of time. It has been found that by heating the hydrocarbon treating vessel formed of the novel austenitic stainless steel to a predetermined time and temperature that falls within normal operating conditions of high temperature hydrocarbon treating processes, sensitization of the hydrocarbon treating vessel does not occur. Surprisingly, sensitization has been reduced or restricted even where the predetermined vessel temperature and the predetermined time for maintaining the process fall within or near the sensitization envelope of austenitic stainless steels traditionally used for the fabrication of hydrocarbon treating vessels. Not to be bound by theory, it is believed that the lower carbon content in the novel austenitic stainless steel reduces or restricts the extent of precipitation of chromium carbides within the alloy along the grain boundaries. This in turn reduces or restricts the formation of chromium depleted zones and the resulting sensitization that typically is present in austenitic stainless steels used for oil refinery complex fabrication. It is further believed that the addition of niobium interacts with the carbon and nitrogen that is present in the material to restrict the formation and precipitation of chromium carbides. It is also believed that the addition of nitrogen in the novel austenitic stainless steel reduces any loss in strength of the hydrocarbon treating vessel that may otherwise occur due to the low carbon content.

Chloride ions may be present in the hydrocarbon treating vessel, which contact the novel austenitic stainless steel and chloride-SCC may be controlled. To this end, chloride levels may be present within the hydrocarbon treating vessel that would typically be sufficient to cause chloride-SCC, however, by employing the portion of the interior surface formed from the novel austenitic stainless steel, chloride-SCC is restricted. It is believed that the inclusion of molybdenum within the novel austenitic stainless steel enhances the passivity of the material in chloride-containing environments by stabilizing the passive chromium oxide film on the material. It is believed that the molybdenum may even repair the passive film if it deteriorates. In this regard, the novel austenitic stainless steel increases pitting and crevice resistance of the portion of the interior surface of the vessel. As a pit is normally the initiation site for chloride stress corrosion cracking, molybdenum also increases chloride stress corrosion cracking resistance.

Further, in addition to strengthening the steel, nitrogen is also believed to have a similar function as molybdenum in terms of resistance to pitting corrosion and chloride-SCC, because nitrogen restricts the formation of chromium-molybdenum phase. In acidic environments, corrosion of metals is generally comprised of concurrent metal dissolution reaction and hydrogen evolution reaction. Suppressing both or any one of the two reactions will reduce the corrosion. The molybdenum in the present novel austenitic stainless steel significantly suppresses hydrogen evolution in most of reducing acids, such as most organic acids, and thus increases the metals' resistance to organic acids.

Turning to more of the particulars, an oil refinery complex for carrying out one or more particular hydrocarbon conversion or treating processes, and particular hydrocarbon treating vessels therein, in accordance herewith, includes equipment for transporting and holding the hydrocarbon stream and for promoting the processes taking place in the complex and/or a vessel. The particular equipment within a given complex will depend on, among other things, the feed and desired products, the processes being carried out, and the operating conditions, including the operating temperatures, pressures, and space velocities.

The equipment may include one or more hydrocarbon treating vessels that may facilitate the flow of the hydrocarbon stream though the complex, contain the hydrocarbon stream therein, and/or promote particular process or processes being accomplished within the complex. The hydrocarbon treating vessels may include, for example, tubing or piping for transporting the hydrocarbon stream and or streams of other materials, such as recycle streams, treatment gases, and catalysts. The piping is typically in the form of hollow pipes with pipe walls having a wall thickness and interior surfaces thereof for directing the flow of a hydrocarbon stream or other material therethrough. Additional structures or discontinuities, such as flanges for connecting pipes together and welds for welding sections of pipe together may also be provided. Nozzles and/or valves may also be incorporated with the piping or other vessels within the complex for controlling the flow of the hydrocarbon stream or other materials through the complex.

Many hydrocarbon treating processes include particular equipment for raising the temperature of the hydrocarbon stream to predetermined process temperatures. For example, hydrocarbon treating vessels within a complex may include combined feed heat exchanger having tubing for running streams adjacent to one another to transfer heat therebetween. For example, the heat exchanger may include piping or other structure for running a hot stream, such as effluent leaving a reactor, adjacent to a cooler stream, for example a feed stream entering a reactor, to increase the temperature of the feed stream to process temperatures. In addition, the complex may include heating elements, such as heating tubes with fired heaters for heating the hydrocarbon feed stream by heat transfer through the heating tubes to raise the temperature of the hydrocarbon feed stream to process temperatures.

An oil refinery complex will also typically include one or more reactors for carrying out one or more treatment steps. For example, a hydrocarbon treating vessel within a complex may include a reactor that facilitates a particular chemical reaction for converting or treating at least one component of the hydrocarbon stream. To this end, the reactor may include a catalyst for promoting the chemical reaction and/or another material, such as a gas, that reacts with the hydrocarbon stream or promotes chemical reactions of the hydrocarbon stream to treat or convert a component of the hydrocarbon stream. The reactor may also be provided to treat the hydrocarbon stream in other manners, such as selectively removing a particular component from the hydrocarbon stream. For example, the reactor may include an adsorbent that selectively adsorbs a particular component of the hydrocarbon stream to remove the component from the hydrocarbon stream to be discarded or captured as a product for distribution or further processing.

Internal equipment and structures are also typically included within the equipment for various reasons. For example, reactor internals may include screens, flanges, flow interrupters or directors, and other structures and equipment for facilitating particular hydrocarbon treating processes. The equipment may be provided for directing the flow of the hydrocarbon stream or other materials within the hydrocarbon treating vessels of the complex. For example, the equipment may be provided for directing the hydrocarbon stream in a certain pattern in order to maximize the exposure of the hydrocarbon stream to other materials, such as, for example a catalyst, adsorbent, and/or a reaction material (e.g. hydrogen gas) within the vessel. The internal equipment may also be provided for holding or moving materials within the vessels, such as screens or packed bed materials that hold a catalyst and allow the hydrocarbon stream to pass therethrough.

In addition, a particular complex for carrying out a specific hydrocarbon treating process may include additional equipment and/or process specific equipment or structures. It is contemplated that the term hydrocarbon treating vessel as used herein includes any of the above described equipment and structures and any other equipment or structures within a particular oil refinery complex. It is also contemplated that internal surfaces of a hydrocarbon treating vessel as used herein includes inner surfaces of the hydrocarbon treating vessel walls and any other structures thereof, as well as surfaces of internal equipment that are exposed within the vessel.

According to one approach the process includes flowing a hydrocarbon stream through the hydrocarbon treating vessel. The hydrocarbon stream may continuously flow through the hydrocarbon treating vessel, or the hydrocarbon stream may flow through the hydrocarbon treating vessel on an intermittent or batch basis. Treatment of the hydrocarbon stream may occur within the hydrocarbon treating vessel, or it may occur in a separate vessel within the hydrocarbon treating complex upstream or downstream from the hydrocarbon treating vessel.

In one approach, the operating of the hydrocarbon treating complex, and the particular hydrocarbon treating process is maintained for a predetermined period of time. Maintaining operation of the hydrocarbon treating vessel includes maintaining the flow of the hydrocarbon stream or other material therethrough and maintaining the temperature of the vessel at the predetermined temperature. As used herein, maintaining operation of the hydrocarbon treating process, complex, or vessel includes operation that is maintained for the predetermined period of time, although the operation may be intermittently or periodically interrupted or shut down for servicing or inspection of the equipment, as is typical in a hydrocarbon treating process. The predetermined temperature as used herein does not necessarily refer to a known temperature, and may include an approximate temperature or a temperature falling within a known range of temperatures.

In one approach, the process includes maintaining operation of the hydrocarbon treating vessel or complex for above 300 hours, with intermittent process shutdowns during the period of time, without sensitization of the interior surfaces of the vessel occurring. In another approach, the process is maintained for a predetermined amount of time of above 1,000 hours without sensitization of the interior surface occurring. In yet another approach, the predetermined period of time is 5,000 hours or greater without sensitization of the interior surface of the vessel occurring. In yet another approach, the predetermined period of time is 10,000 hours or greater without sensitization of the interior surface of the vessel occurring. It should be noted that as described herein, sensitization is not considered to occur where the amount of sensitization of the internal surfaces within the hydrocarbon treating vessel that occurs is insufficient to cause polythionic acid stress corrosion cracking of the equipment within the predetermined amount of time.

In one approach, the process includes a high temperature process for converting a hydrocarbon stream. In this approach, the hydrocarbon stream is heated to a high process temperature during treatment thereof. In this regard, at least a portion of the interior surface of the hydrocarbon treating vessel is heated to a vessel temperature by, for example, direct heating of the vessel in order to heat the hydrocarbon stream flowing therethrough or through heat transfer from an already heated hydrocarbon stream flowing through the vessel to the vessel internal surfaces. In one approach, at least a portion of the internal surface of the vessel is heated to a predetermined vessel temperature. In another approach, some or all of the internal surfaces of the vessel or a plurality of hydrocarbon treating vessels within a hydrocarbon treating complex are heated to a predetermined temperature of above 400° C. In another approach, the predetermined vessel temperature is above 550° C. In yet another approach, the predetermined vessel temperature is 565° C. or greater. In still another approach, a maximum predetermined vessel temperature is below 700° C. In this manner, during the process, the vessel is heated within a temperature range that is within typical operating parameters of hydrocarbon treating processes and complexes. The predetermined temperatures are also within a range at which the sensitization of similar austenitic stainless steels usually occurs, as shown by the sensitization envelopes in FIG. 1, while restricting or reducing sensitization thereof. The relatively high predetermined temperatures are also temperatures at which chloride-SCC is typically observed when chloride is present in the system in sufficiently high concentrations. As used herein, the term predetermined temperature does not necessarily refer to a constant or known temperature, and may include, for example, an average temperature, a median temperature, a temperature range, and the like.

In one approach, the process includes controlling sensitization of at least a portion of an interior surface of the hydrocarbon treating vessel by employing a portion of the interior surface that is formed from a novel austenitic stainless steel. The novel austenitic stainless steel has a composition including 0.005 to 0.020 wt-% carbon, up to 1.00 wt-% silicon, up to 2.00 wt-% manganese, from 9.0 to 13.0 wt-% nickel, 17.0 to 19.0 wt-% chromium, 0.20 to 0.50 wt-% niobium, and 0.06 to 0.10 wt-% nitrogen. The remainder of the composition of the novel austenitic stainless steel includes iron and may include one or more additional components. Table 1 below shows the composition of the novel austenitic stainless steel (NASS) and other austenitic stainless steels traditionally used to form hydrocarbon treating vessels.

TABLE 1

Composition of Novel Austenitic Stainless Steel and Comparison with other Austenitic Stainless Steels for Hydrocarbon Conversion Vessels

| | C | Si | P | S | Mn | Ni | Mo | Cu | Cr | Nb | N |
|---|---|---|---|---|---|---|---|---|---|---|---|
| NASS | 0.005-0.020 | 1.00 Max | 0.045 Max | 0.030 Max | 2.00 Max | 10-13 | 1.0-7 | 0.5-2 | 15-24 | 0.20-0.50 | 0.06-0.10 |
| 347H | 0.04-0.10 | 1.00 Max | 0.045 Max | 0.030 Max | 2.00 Max | 9.0-13.0 | — | — | 17.0-19.0 | 0.40-1.0 | — |
| 347 | 0.08 Max | 1.00 Max | 0.045 Max | 0.030 Max | 2.00 Max | 9.0-13.0 | — | — | 17.0-19.0 | 0.40-1.0 | — |

At least a portion of the interior surface of the hydrocarbon treating vessel is formed of the novel austenitic stainless steel. The interior surface may include the walls of the vessel or may include surfaces of other structures or apparatuses within the vessel. For example, where the vessel is a tube or pipe, the interior surface may include internal surfaces, i.e. hydrocarbon contacting surfaces, of the walls of the tube or pipe, and the surfaces of any flanges or welds that are exposed within the hydrocarbon treating vessel. Similarly, where the vessel includes a reactor or other structure, the interior surface of the vessel may include interior surfaces of the walls of the vessel as well as surfaces of reactor internal equipment and structures within the reactor that are subject to high temperatures and other materials within the reactor.

In one form, the process includes identifying one or more PTA-SCC and/or chloride-SCC affected zones of an interior surface of the hydrocarbon treating vessel or vessels and employing these affected zones formed from the novel austenitic stainless steel alloy. The process may also include identifying another non-PTA and/or chloride SCC affected portion of the interior surface of the hydrocarbon treating vessel and employing the non-affected portion formed from another material, including for example traditional types 304 or 347 stainless steel. In this manner, the novel austenitic stainless steel may be incorporated in areas where sensitization has been identified to result in PTA-SCC and/or chloride-SCC has been identified to occur, and not in other areas that have not been identified as posing a significant risk, due to, for example, limited exposure to heat, limited exposure to moisture, oxygen, chloride, or hydrogen sulfide, so that PTA and/or -SCC is not expected in these areas. In this manner, fabrication costs may be reduced by reducing the amount of the specialty novel austenitic stainless steel used in forming the vessel. A less expensive material may then be employed in other areas of the vessel where SCC is not identified as being problematic.

In another approach, the process may include forming all interior surfaces of the hydrocarbon treating vessel from the novel austenitic stainless steel. In yet another approach, interior surfaces of a plurality of hydrocarbon treating vessels within a hydrocarbon treating complex may be formed of the novel austenitic stainless steel. In the foregoing approaches, by incorporating the novel austenitic stainless steel within the complex or a particular vessel, sensitization and chloride-SCC may be reduced. In this regard, the interior surfaces may resist corrosion from polythionic acid and chloride and the resulting SCC even if hydrogen sulfide within the system is allowed to interact with oxygen or moisture and chloride levels are allowed within the system above predetermined levels.

It has been found that welds within a complex vessel or connecting hydrocarbon treating vessels together can be particularly susceptible to PTA-SCC due to residual stresses that typically result during welding of a material. Traditionally, post weld heat treatment has been required to relieve these residual stresses in the weld location in order to reduce the localized stresses that would otherwise promote PTA-SCC from occurring. It has been surprisingly found that by forming at least an interior surface of the vessel with the novel austenitic stainless steel alloy, the post weld heat treatment step may be avoided, thus saving time and resources and reducing the cost of fabrication of the complex.

According to another approach, interior surfaces of the vessel are formed from the novel austenitic stainless steel by employing an entire thickness of a vessel wall formed from the material. In this regard, sensitization and chloride-SCC is restricted or reduced through the entire thickness of the vessel wall. By another approach, the process includes employing an interior surface of the hydrocarbon treating vessel that is formed from the novel austenitic stainless steel and employing outer portions of the vessel walls formed from a second material. To this end, a novel austenitic stainless steel coating may be applied on the interior surfaces of the vessel walls or internal equipment. In another example, a weld overlay or cladding formed from the novel austenitic stainless steel alloy may be may be employed on the interior surface of a second material to provide an interior surface formed of the novel austenitic stainless steel. In another example, sheets formed from the novel austenitic stainless steel may be attached to inner surfaces of an outer shell formed of a second material by welding or other known methods for attaching the plates to the vessel walls. Other methods for employing interior surface of the vessel formed from the novel austenitic stainless steel while employing outer portions of the vessel wall formed from the second material are also contemplated herein. Similar to the discussion above regarding forming affected zones from the novel austenitic stainless steel, by forming the interior surface of the vessel walls from the novel austenitic stainless steel while forming outer portions of the walls from a second material, fabrication costs may be reduced by using a less expensive material. In addition, the second material may be selected to provide other beneficial characteristics such as superior strength or resistance to other environments or conditions that affect outer portions of the vessel.

Turning to more of the particulars, as the hydrocarbon stream flows through the vessel, according to one approach, sulfur is present within the vessel, for example as a contaminant in the hydrocarbon stream or as $H_2S$ added to the hydrocarbon treating vessel to restrict coking within the vessel. During operation, the sulfur may form an iron sulfide scale layer on the interior surface of the vessel. The formation of the iron sulfide scale on the interior surface of the vessel interacts with oxygen and moisture if the system is opened to the atmosphere without appropriate neutralization or purging, as has been previously done, to form polythionic acid. The polythionic acid is responsible for PTA-SCC.

In this regard, in one approach, the hydrocarbon treating complex or vessel is temporarily shut down, either during the predetermined time for maintained operation of the hydrocarbon treating complex, or after the predetermined time. The process includes opening hydrocarbon treating complex or vessel to the atmosphere. The hydrocarbon treating complex may be opened to the atmosphere, for example, to allow servicing or inspection. As mentioned above, in one approach, the hydrocarbon treating complex, or a vessel thereof is opened to the external environment without neutralizing or purging the hydrocarbon treating vessel so that the interior of the vessels are subjected to the external environment. In this regard, oxygen and moisture are allowed to enter the vessel and interact with the sulfur, hydrogen sulfide, and or iron sulfide scale within the vessel to form polythionic acid. In other words, during shutdown and startup procedures of the complexes, no steps are taken to restrict the formation of polythionic acid within the vessel such that the polythionic is allowed to form.

It has been surprisingly discovered, however, that by forming interior surfaces of the vessel with the novel austenitic stainless steel alloy, the polythionic acid that is present within the vessel will not cause polythionic stress corrosion cracking within the predetermined amount of time. It is believed, that the novel austenitic stainless steel may in fact be immune to sensitization. Not to be bound by theory, it is believed that because sensitization of the stainless steel alloy does not occur in the high temperature operating conditions present within the vessel, the occurrence of chromium depleted zones typically present as a result of sensitization are minimized such that the polythionic acid is not able to corrode the stainless steel alloy because the protective chromium layer remains generally intact. In this manner, the process includes exposing the hydrocarbon treating complex or vessel to the external environment without taking steps to reduce or restrict the formation of polythionic acid and controlling corrosion of an interior surface of the vessel by the polythionic acid.

The amount of sensitization that occurs within the novel austenitic stainless steel alloy may be measure according to ASTM A262, Section 6 Classification of Etch Structures and ASTM A262 Practice C Corrosion Rate Nitric acid Test. The degree of sensitization may also be quantified per ASTM G108 Electrochemical Reactivation (EPR) test. Based on the normalized charge (Pa) in units of coulombs/cm2, the degree of sensitization can be determined (see an excerpt below for 304/304 L). In one approach, the Pa value of the novel austenitic stainless steel alloy may be below 0.4 indicating that only slight sensitization of the interior surface portion will occur within the predetermined period of time. In another approach, the Pa value of novel austenitic stainless steel alloy is below 0.10 indicating that no sensitization will occur after the predetermined period of time. In another approach, the Pa value may be below 0.05. In yet another approach, the Pa value may be below 0.01.

In another approach, as the hydrocarbon stream flows through the vessel, chloride is present within the vessel. The concentration of chloride within the vessel may be above an amount that typically results in chloride-SCC. In one approach, chloride is present within the vessel at a concentration between 0 and 50 ppm. In another approach, chloride is present in a concentration between 1 and 15 ppm. In yet another approach, chloride is present in a concentration between 5 and 15 ppm. In yet another approach, chloride is present in a concentration between 5 and 10 ppm. It is believed that due to the molybdenum present in the novel austenitic stainless steel, the relatively high concentration of chloride within the vessel does not cause significant chloride-SCC of the interior portion thereof.

Table 2 below provides specific examples of hydrocarbon treating processes in accordance with the present invention. The invention is not intended to be bound by these examples. Table 2 provides source of sulfur and the process temperature for each of the processes. In each example, the process is maintained for the predetermined amount of time as described previously, and may be intermittently shut down or stopped during the predetermined amount of time. The table also indicates whether hydrogen sulfide is present in the hydrocarbon stream or injected into the process.

TABLE 2

Example Hydrocarbon Conversion Processes in Accordance with the Invention

| PROCESS | FEED | SULFUR | CHLORIDE | PRODUCTS | PROCESS TEMP (C.) | REACTOR - Primary Processing Goal |
|---|---|---|---|---|---|---|
| Formation of renewable diesel from natural oils | Natural (triglyceride) Oils/fats | Injected co-feed | Present in feed <50 ppm | Renewable Diesel | 230-455 | Deoxygenation ($1^{st}$ stage) and Isomerization ($2^{nd}$ Stage) |
| Formation of Renewable Jet Fuel | Natural (triglyceride) Oils/fats | Injected co-feed | Present in feed <50 | Renewable Jet | 230-455 | Deoxygenation ($1^{st}$ stage) and Selective Cracking ($2^{nd}$ Stage) |
| Hydroprocessing - Hydrotreating | Naphtha, Kerosene, Diesel, VGO, DAO, Resids, Coker Gas Oils | Present in feed | Present in feed <5 ppm | Low sulfur Naphtha, Kerosene, Jet Fuel, Diesel, or VGO | 230-500 | Sulfur removal |
| Hydroprocessing - Hydrocracking | Diesel, VGO, DAO, Resids, Coker Gas Oils | Present in feed | Present in feed <5 ppm | Low sulfur Naphtha, Kerosene, Jet Fuel, Diesel, UCO | 230-500 | Sulfur removal and cracking (in one or two stages) |

TABLE 2-continued

Example Hydrocarbon Conversion Processes in Accordance with the Invention

| PROCESS | FEED | SULFUR | CHLORIDE | PRODUCTS | PROCESS TEMP (C.) | REACTOR - Primary Processing Goal |
|---|---|---|---|---|---|---|
| Production of olefins from paraffins | Propane or iso-Butane | Injected co-feed | Catalyst <10 ppm | Propylene/iso-Butylene | 550-700 | Dehydrogenation |
| Conversion of LPG to Liquid Aromatics | LPG (propane and butane) | Injected co-feed | — | Benzene/Toluene | 550-700 | Dehydrocyclization |
| Olefin cracking | C4-C6 Olefins | Injected co-feed | — | Ethylene/Propylene | 500-750 | Cracking |
| High temperature reforming | Naphthas | Injected co-feed | Catalyst <10 ppm | Aromatics/isoparaffins | 550-700 | Dehydrogenation and isomerization to form aromatics and branched paraffins |

Preferred embodiments of this invention are described herein, including the best mode known to the inventors for carrying out the invention. It should be understood that the illustrated embodiments are exemplary only, and should not be taken as limiting the scope of the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated. Pressures are given at the vessel outlet and particularly at the vapor outlet in vessels with multiple outlets.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for treating a hydrocarbon stream containing hydrogen sulfide and chloride compound, the process comprising:
    flowing the hydrocarbon stream through a hydrocarbon treating vessel;
    heating at least a portion of an interior surface of the vessel to a predetermined vessel temperature of 400° C. or greater for 300 hours or more;
    allowing a portion of the hydrogen sulfide to interact with oxygen and air within the vessel to form polythionic acid and controlling stress corrosion cracking of the portion due to the polythionic acid;
    controlling sensitization and chloride stress corrosion cracking of the portion of the hydrocarbon treating vessel by employing a hydrocarbon treating vessel with at least the portion thereof formed of a novel austenitic stainless steel alloy having a Pa value of below 0.10 comprising 0.005 to 0.020 wt-% carbon, 10 to 30 wt-% nickel, 15-24 wt-% chromium, 0.20 to 0.50 wt-% niobium, 0.06 to 0.10 wt-% nitrogen, up to 5% copper, and 1.0 to 7 wt-% molybdenum to restrict sensitization and chloride stress corrosion cracking of the portion of the interior surface;
    intermittently stopping flowing the hydrocarbon stream, reducing the vessel temperature below the predetermined temperature, and exposing the interior of the hydrocarbon treating vessel to an external environment including oxygen and moisture without neutralizing or purging the interior of the hydrocarbon treating vessel and without causing polythionic acid stress corrosion cracking of the portion of the interior surface.

2. The process of claim 1, wherein the predetermined vessel temperature is maintained within the hydrocarbon treating vessel between 565° C. and 700° C.

3. The process of claim 1, further comprising forming a chloride concentration within the hydrocarbon treating vessel above 5 ppm and allowing the chloride to contact the portion of the interior surface and restricting chloride stress corrosion cracking of the portion.

4. The process of claim 1, further comprising maintaining the predetermined vessel temperature and a chloride concentration of above 2 ppm within the hydrocarbon treating vessel for more than 1,000 hours and restricting sensitization and chloride stress corrosion cracking of the portion of the interior surface of the vessel for at least the 1,000 hours.

5. The process of claim 1, further comprising identifying affected zones of the interior surface of the hydrocarbon treating vessel that are maintained at the predetermined temperature and exposed to chloride concentrations above 1 ppm, and controlling sensitization and chloride stress corrosion cracking of the affected zones by employing a hydrocarbon treating vessel having the affected zones formed from the novel austenitic stainless steel alloy and other zones formed from another material.

6. The process of claim 1, further comprising welding the interior surface of the vessel, wherein welded material is formed from a stainless steel alloy comprising 0.005 to 0.020 wt-% carbon, 10 to 30 wt-% nickel, 15-24 wt-% chromium, 0.20 to 0.50 wt-% niobium, 0.06 to 0.10 wt-% nitrogen, up to 5% copper, and 1.0 to 7 wt-% molybdenum to control sensitization and chloride stress corrosion cracking of the welded material.

* * * * *